(12) United States Patent
Ogura et al.

(10) Patent No.: US 8,408,030 B2
(45) Date of Patent: Apr. 2, 2013

(54) DEVICE FOR MANUFACTURING MOLDED GLASS BODY

(75) Inventors: Kazuyuki Ogura, Yao (JP); Yoshihiro Kamada, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/119,425

(22) PCT Filed: Sep. 10, 2009

(86) PCT No.: PCT/JP2009/065816
§ 371 (c)(1), (2), (4) Date: Mar. 16, 2011

(87) PCT Pub. No.: WO2010/032670
PCT Pub. Date: Mar. 25, 2010

(65) Prior Publication Data
US 2011/0185770 A1 Aug. 4, 2011

(30) Foreign Application Priority Data
Sep. 19, 2008 (JP) .................. 2008-240615

(51) Int. Cl.
- C03B 11/00 (2006.01)
- C03B 11/05 (2006.01)
- C03B 11/08 (2006.01)
- C03B 11/02 (2006.01)

(52) U.S. Cl. .......... 65/306; 65/305; 65/309; 65/323

(58) Field of Classification Search .......... 264/1.3–1.19; 65/140, 223–226, 305–319
See application file for complete search history.

(56) References Cited

U.S. PATENT DOCUMENTS

| | | | | |
|---|---|---|---|---|
| 3,372,017 | A | * | 3/1968 | Pitbladdo ........................ 65/162 |
| 3,655,206 | A | * | 4/1972 | Adams ........................... 277/396 |
| 4,116,451 | A | * | 9/1978 | Nixon et al. ................... 277/554 |
| 4,606,750 | A | * | 8/1986 | Torii et al. ................... 65/374.13 |
| 4,685,948 | A | * | 8/1987 | Kuribayashi et al. ............. 65/26 |
| 4,836,840 | A | * | 6/1989 | Hirota et al. ..................... 65/323 |
| 5,032,159 | A | * | 7/1991 | Kuwabara et al. ................ 65/64 |
| 5,215,566 | A | * | 6/1993 | Yamamoto et al. .......... 65/29.12 |
| 5,378,255 | A | * | 1/1995 | Ito ................................. 65/64 |
| 5,588,980 | A | * | 12/1996 | Ito ................................. 65/223 |
| 5,713,975 | A | * | 2/1998 | Schonfeld et al. ............. 65/25.1 |

(Continued)

FOREIGN PATENT DOCUMENTS
| JP | 07069654 A * | 3/1995 |
|---|---|---|
| JP | 8-109031 | 4/1996 |

(Continued)

*Primary Examiner* — Jodi C Franklin
(74) *Attorney, Agent, or Firm* — Cozen O'Connor (57) ABSTRACT

There is provided a device for manufacturing a molded glass body, including a fall-prevention means for preventing the glass molded body which has stuck on the upper mold from falling down on the lower mold. Thus, the molded glass body does not damage the lower mold, even if the molded glass body which has stuck on the upper mold falls down from the upper mold, during a period from an end of the pressure molding to releasing and withdrawing the molded glass body obtained by the pressure molding from the any one of the upper mold and the lower mold.

10 Claims, 7 Drawing Sheets

U.S. PATENT DOCUMENTS

| | | | |
|---|---|---|---|
| 5,976,425 A * | 11/1999 | Nomura et al. | 264/2.2 |
| 6,732,868 B2 | 5/2004 | Takagaki et al. | |
| 7,204,649 B2 * | 4/2007 | Tanaka | 385/93 |
| 2004/0107729 A1 * | 6/2004 | Fukami et al. | 65/25.4 |
| 2005/0120747 A1 * | 6/2005 | Fujimoto | 65/29.1 |
| 2006/0162385 A1 * | 7/2006 | Yamanaka et al. | 65/102 |
| 2006/0198034 A1 * | 9/2006 | Shikano et al. | 359/811 |
| 2006/0251363 A1 * | 11/2006 | Shikano et al. | 385/94 |
| 2009/0107180 A1 * | 4/2009 | Sakai et al. | 65/66 |
| 2009/0205375 A1 * | 8/2009 | Miyazaki | 65/500 |
| 2011/0167872 A1 * | 7/2011 | Ogura et al. | 65/66 |
| 2011/0185770 A1 * | 8/2011 | Ogura et al. | 65/182.2 |

FOREIGN PATENT DOCUMENTS

| | | |
|---|---|---|
| JP | 10-36126 | 2/1998 |
| JP | 2002-273121 | 9/2002 |
| JP | 2007-186358 | 7/2007 |
| JP | 2007-191361 | 8/2007 |
| WO | WO 2008050846 A1 * | 5/2008 |

\* cited by examiner

DEVICE FOR MANUFACTURING MOLDED GLASS BODY

RELATED APPLICATIONS

This application is a U.S. National Phase Application under 35 USC 371 of International Application PCT/JP2009/065816 filed Sep. 10, 2009.

This application claims the priority of Japanese application No. 2008-240615 filed Sep. 19, 2008, the entire content of which is hereby incorporated by reference.

TECHNICAL FIELD

The present invention relates to a device for manufacturing a molded glass body, and especially to a device for manufacturing a molded glass body, for pressure-molding a glass precursor with an upper mold and a lower mold to obtain a molded glass body.

BACKGROUND ART

There are used many molded glass bodies manufactured by pressure-molding a glass material with molds, as optical elements for various optical devices such as a lens for a digital camera, an optical pickup lens for DVDs, a camera lens for a cell phone, and a coupling lens for an optical communication. A required level of molded glass bodies to be employed as such the optical elements is becoming much more higher, corresponding to the recent trend toward smaller-sized and higher-accurate optical products.

As a manufacturing method of such the molded glass body, there is known a method (for example, refer to Patent Literature 1) to previously prepare a glass preform having a predetermined mass and predetermined shape and to pressure-mold the glass preform by heating the glass preform with moldings (hereinafter, it is referred as a reheat pressing method).

On the other hand, as another method of manufacturing the molded glass body, there is known a method (for example, refer to Patent Literature 2) to drip a drop of molten glass on a mold whose temperature is kept to a predetermined temperature being lower than that of the drop of molten glass and to pressure-mold the drop with the molds before the drop of molten glass which has been chipped is cooled and solidified (hereinafter, it is referred as a liquid-drop molding method).

CITATION LIST

Patent Literature

Patent literature 1: JP-A No. 2001-80924
Patent literature 2: JP-A No. 2007-186358

SUMMARY OF INVENTION

Technical Problem

However, because the liquid-drop molding method is a method to pressure-mold the drop before the drop of molten glass which has been dropped is cooled and solidified, the temperature of the drop of molten glass only falls rapidly because of heat radiation from its surface which touches the molds. Therefore, it is very hard to control the glass temperature artificially with accuracy under a pressing process.

Therefore, it is very hard to control surely which of the upper mold or the lower mold the molded glass body sticks on, and is hard to control surely the degrees of stick strength to respective molds. Therefore, if the molded glass body sticks on the upper mold and its stick strength is weak, the molded glass body can fall down from the upper mold during a period from the end of pressure molding to releasing and withdrawing the molded glass body from the mold, and the molded glass body can strike and damage the lower mold which is placed directly under the upper mold, which can be a problem. Because the damaged lower mold cannot be used to the manufacturing process as it is, the lower mold is required to be replaced, which significantly deteriorates its productivity because of an operation stop for replacing the lower mold and causes problems such as cost increase of the lower mold.

In the reheat press method, it is relatively easy to control which of the upper mold or lower mold the molded glass body sticks on, and to control the degrees of stick strength to respective molds, by controlling temperature of the mold in the molding operation or in cooling operation. However, the possibility that problems being similar to those of the drop molding method can be caused is not nil.

The present invention is achieved in view of the above circumstances, and aims to provide a device for manufacturing a molded glass body wherein the molded glass body does not damage the lower mold, even if the molded glass body which has stuck on the upper mold falls down from the upper mold, during a period from an end of the pressure molding to releasing and withdrawing the molded glass body obtained by the pressure molding from the any one of the upper mold and the lower mold.

Solution to Problem

An object of the present invention will be achieved by the following structures.

1. A device for manufacturing a molded glass body comprising:
an upper mold and a lower mold for pressure-molding a glass precursor to obtain a molded glass body; and
a mold-releasing means for releasing and withdrawing the molded glass body which has stuck on one of the upper mold and the lower mold,
the device for manufacturing a molded glass body characterized by further comprising: a fall-prevention means for preventing the glass molded body which has stuck on the upper mold from falling down on the lower mold during a period from an end of the pressure molding to releasing and withdrawing the molded glass body obtained by the pressure molding from the any one of the upper mold and the lower mold.

2. The device for manufacturing a molded glass body of Item 1, characterized in that one of the upper mold and the lower mold moves to a standby position in a direction that the upper mold and the lower mold are separated from each other, after the pressure molding is completed.

3. The device for manufacturing a molded glass body of Item 2, characterized in that the fall-prevention means works while the one of the upper mold and the lower mold moves to the standby position.

4. The device for manufacturing a molded glass body of Item 2, characterized in that the mold-releasing means works after the one of the upper mold and the lower mold stops at the standby position.

5. The device for manufacturing a molded glass body of Item 4, characterized in that the mold-releasing means sucks and withdraws the molded glass body which has stuck on one of the upper mold and the lower mold.

6. The device for manufacturing a molded glass body of any one of Items 1 to 3, characterized in that the fall-prevention means is a trap device inserted to a position between the upper mold and the lower mold, for receiving the molded glass body which is falling down.

7. The device for manufacturing a molded glass body of any one of Items 1 to 3, characterized in that the fall-prevention means is an air-blow device for blowing gas against a space between the upper mold and the lower mold, to blow off the molded glass body which is falling down.

8. The device for manufacturing a molded glass body of any one of Items 1 to 7, characterized in that the glass precursor is a drop of molten glass which falls on the lower mold.

9. The device for manufacturing a molded glass body of any one of Items 1 to 7, characterized in that the glass precursor is a glass preform having a predetermined mass and a predetermined shape.

Advantageous Effects of Invention

According to the present invention, there can be provided a device for manufacturing a molded glass body, including a fall-prevention means for preventing the glass molded body which has stuck on the upper mold from falling down on the lower mold, during a period from an end of the pressure molding to releasing and withdrawing the molded glass body obtained by the pressure molding from the any one of the upper mold and the lower mold. Thereby, the molded glass body does not damage the lower mold, even if the molded glass body which has stuck on the upper mold falls down from the upper mold.

DESCRIPTION OF EMBODIMENTS

The present invention will be described below based on the illustrated embodiments. However, the scope of the invention is not limited to the embodiments. In the drawings, the same or similar portions will be numbered by the same numbers and duplicable descriptions will be omitted.

Figure 6:
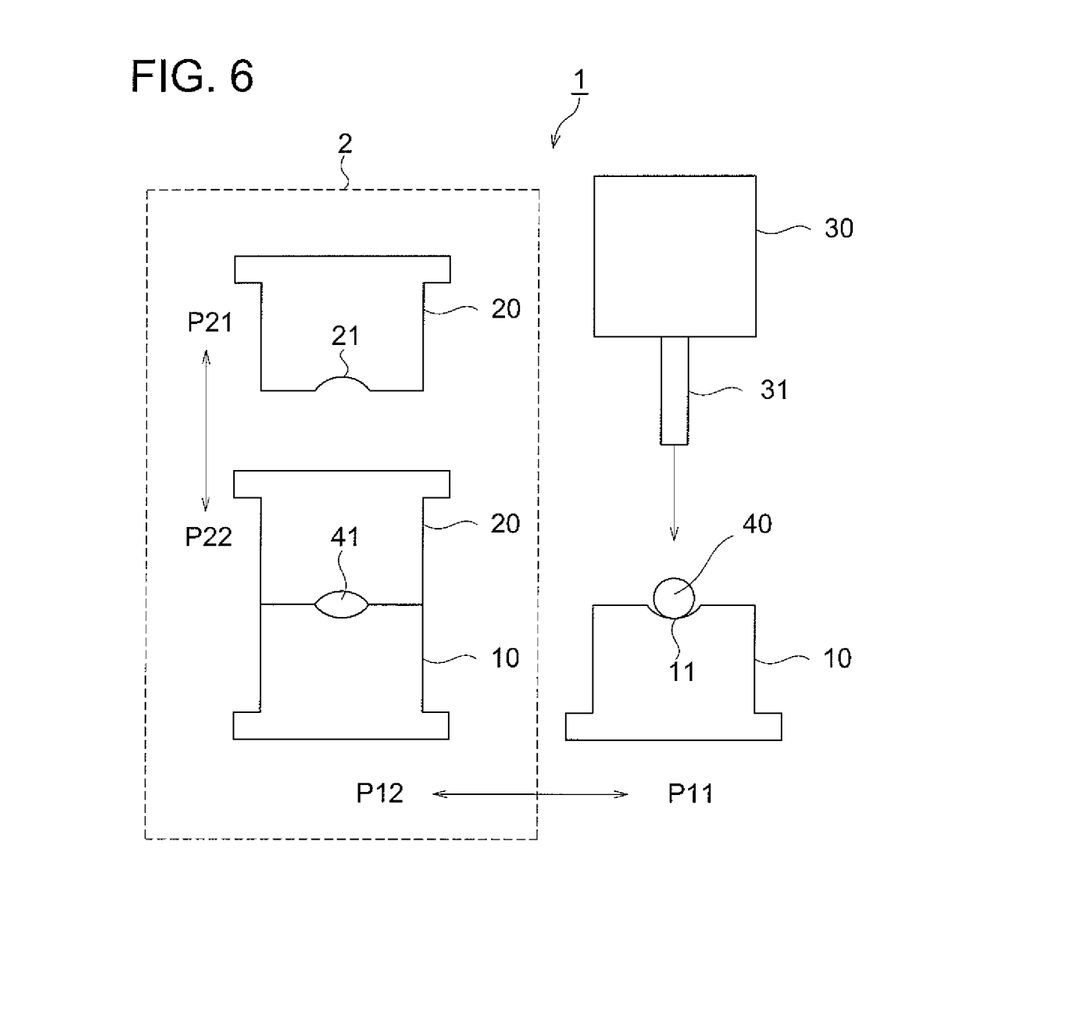
FIG. 6 shows a schematic view illustrating a structure and operations of a conventional device for manufacturing molded glass bodies.

First, the structure and operations of a conventional manufacturing device of molded glass bodies will be described with referring to FIG. 6. FIG. 6 shows a schematic view illustrating a structure and operations of a conventional device for manufacturing molded glass bodies.

In FIG. 6, device for manufacturing a molded glass body 1 is a manufacturing apparatus for use in the above-described liquid-drop molding method, and is composed of melting tank 30 for storing molten glass, dripping nozzle 31 connected to the lower portion of melting tank 30, lower mold 10 for receiving drop of molten glass 40, and upper mold 20 for pressing drop of molten glass 40 together with lower mold 10. Lower mold 20 and upper mold 10 forms pressure molding machine 2.

Lower mold 10 is structured to be movable by an unillustrated drive means in the horizontal direction between a position for receiving drop of molten glass 40 under dripping nozzle 31 (dripping position P11) and a position for facing upper mold 20 to perform the pressure-molding of drop of molten glass 40 (pressing position P12).

Upper mold 20 is structured to be movable by an unillustrated drive means in the vertical direction between a position for waiting before and after the pressure-molding operation (standby position P21) and a position for facing lower mold 10 to perform of the pressure-molding of drop of molten glass 40 (pressing position P22).

Next, its operations will be described. Lower mold 10 moves to dripping position P11, then, molten glass stored in melting tank 30 falls down through dripping nozzle 31 connected to the lower portion of melting tank 30 onto molding surface 11 of lower mold 10, to form drop of molten glass 40.

Lower mold 10 which has received drop of molten glass 40 moves to pressing position P22, then, upper mold 20 goes down from standby position P21 to pressing position P22. Drop of molten glass 40 is pressure-molded between molding surface 21 of upper mold 20 and molding surface 11 of lower mold 10, and molded glass body 41 is obtained. After the pressure-molding is completed, upper mold goes up to standby position P21 and molded glass body 41 is withdrawn.

Next, the problems to be solved in the present invention will be confirmed with referring to FIGS. 7a to 7e. FIGS. 7a to 7e are diagrams for confirming the problems to be solved in the present invention, and are schematic views illustrating conventional operations and their problem during a period that molded glass body 41 is withdrawn after the pressure-molding is completed until the method moves to the next pressure-molding operation.

Figure 7A:
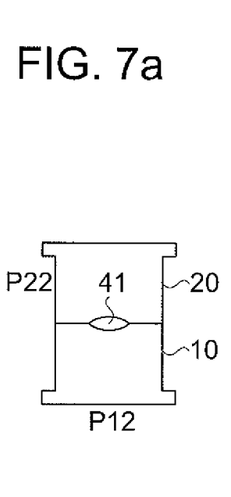
FIGS. 7a to 7e show schematic views illustrating conventional operations and problems.
Figure 7B:
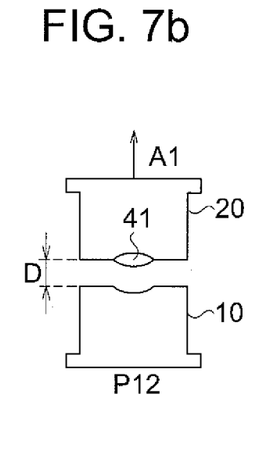

When pressure-molding of molded glass body 41 with upper mold 20 and lower mold 10 has been completed as shown in FIG. 7a, upper mold 20 starts moving from pressing position P22 in first direction A1 which is a direction increasing distance D between the upper mold and lower mold as shown in FIG. 7b, in other words, the upper direction in the figure. At that time, which of the upper mold 20 and the lower mold 10 molded glass body 41 sticks on, depends on conditions such as variations of molding pressure and molding temperature, and surface conditions of molding surface 21 of upper mold 20 and molding surface 11 of lower mold 10. It is difficult to set proper conditions by which the molded glass body always sticks on either of them. In FIG. 7b, it is assumed that the molded glass body sticks on upper mold 20.

Figure 7C:
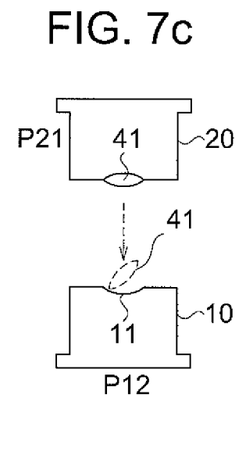
Figure 7D:
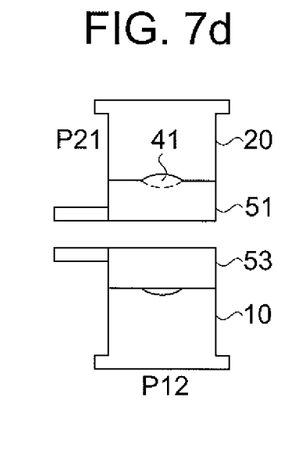

When upper mold 20 reaches at standby position P21 and stops as shown in FIG. 7c, mold-releasing arms 51 and 53 for withdrawing molded glass body 41 are inserted to positions facing molding surface 21 of upper mold 20 and molding surface 11 of lower mold 11, respectively, and the molded glass body 41 is withdrawn as shown in FIG. 7d. Herein, mold-releasing anus 51 and 53 correspond to a withdrawing device for withdrawing molded glass body 41 by a method to suck the body by, for example, vacuum chuck, and are usually on standby at an unillustrated retracting position.

Figure 7E:
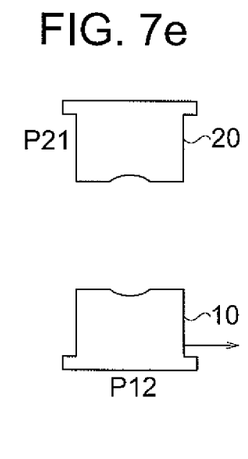

When withdrawing of molded glass body 41 is completed as shown in FIG. 7e, a series of operations is finished. If the method moves to the next operations of manufacturing a molded glass body immediately, lower mold 10 starts moving from pressing position P12 toward dripping position P11.

At that time, if molded glass body 41 which has stuck on upper mold 20 comes off during a period from the completion of the pressure-molding in FIG. 7a to the completion of withdrawing molded glass body in FIG. 7d, it causes an accident that, for example, molded glass body 41 falls down on molding surface 11 of lower mold 10 as illustrated by broken lines in FIG. 7c and damages the molding surface 11. When withdrawing molded glass body 41 results in failure in FIG. 7d, the similar accident is caused. Those are problems to be solved in the present invention.

Figure 1:
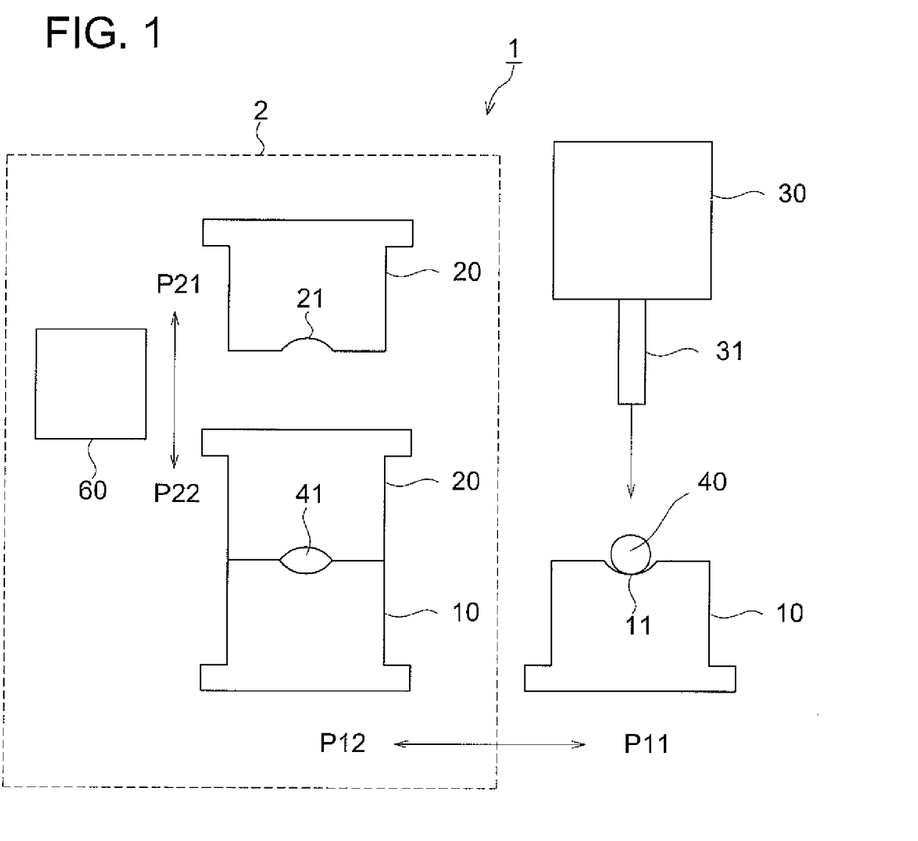
FIG. 1 shows a schematic view illustrating a structure and operations of a device for manufacturing molded glass bodies relating to the first embodiment.

Next, the structure and operations of a device for manufacturing molded glass bodies in the first embodiment of the present invention will be described with referring to FIG. 1. FIG. 1 shows a schematic view illustrating the structure and operations of a device for manufacturing molded glass bodies in the first embodiment of the present invention.

In FIG. 1, device for manufacturing molded glass bodies 1 is a manufacturing device for use in the liquid-drop molding method, and is composed of trap device 60 as a fall-prevention means of the present invention, additionally to melting tank 30 for storing molten glass, dripping nozzle 31 connected to the lower portion of melting tank 30, lower mold 10 for receiving drop of molten glass 40, and upper mold 20 for pressing drop of molten glass 40 together with lower mold 10 which are shown in FIG. 6. Trap device 60 and its operations will be described blow with referring to FIG. 2 and FIGS. 3a to 3e. Lower mold 10 and upper mold 20 form pressure-molding machine 2.

Lower mold 10 is structured to be movable by an unillustrated drive means in the horizontal direction, between a position for receiving drop of molten glass 40 under dripping nozzle 31 (dripping position P11) and a position for facing upper mold 20 to perform the pressure-molding of drop of molten glass 40 (pressing position P12).

In this situation, drop of molten glass 40 corresponds to a glass precursor of the present invention, and dripping position P11 corresponds to a glass-precursor-loading position of the present invention.

Upper mold 20 is structured to be movable by an unillustrated drive means in the vertical direction, between a position for waiting before and after the pressure-molding (standby position P21) and a position for facing lower mold 10 to perform the pressure-molding of drop of molten glass 40 (pressing position P22).

The first embodiment employs a structure that only upper mold 20 moves in a pressing direction, but the scope of the present invention is not limited to that. It may employ a structure that upper mold 20 is fixed and only lower mold 20 moves in the pressing direction, or a structure that both lower mold 10 and upper mold 20 move.

Material of lower mold 10 and upper mold 20 can be selected properly from the following well-known materials for a mold for pressure-molding a molded glass body: heat-resistant alloys (such as stainless steel), superhard materials based on tungsten carbide, various ceramics (such as silicon carbide, silicon nitride, and aluminium nitride), composite materials including carbon. Lower mold 10 and upper mold 20 can be formed of the same material, or of different materials from each other.

Further, it is preferable that coating layers are deposited on at least molding surfaces 11 and 12, for enhancing durability of lower mold 10 and upper mold 20 and preventing them from fusing to drop of molten glass 40. Material of the coating layers is not especially limited, too, and for example, the followings can be used: various metals (such as chrome, aluminium, and titanium), nitrides (chrome nitride, aluminium nitride, titanium nitride, and boron nitride), and oxides (chrome oxide, aluminium oxide, and titanium oxide). The method of forming the coating layers is not limited, too, and can be selected properly from well-known methods of forming layers. For example, there can be cited vacuum deposition, spattering, and CVD.

Lower mold 10 and upper mold 20 are structured to be heated to a predetermined temperature with a heating means which is not illustrated. A heating means can be selected from well-known heating means properly. For example, there can be used a cartridge heater which is used with being embedded inside of a member to be heated, a sheet-type heater which is used with touching with the outside of a member to be heated, infrared heater, and high-frequency induction heater.

Figure 2:
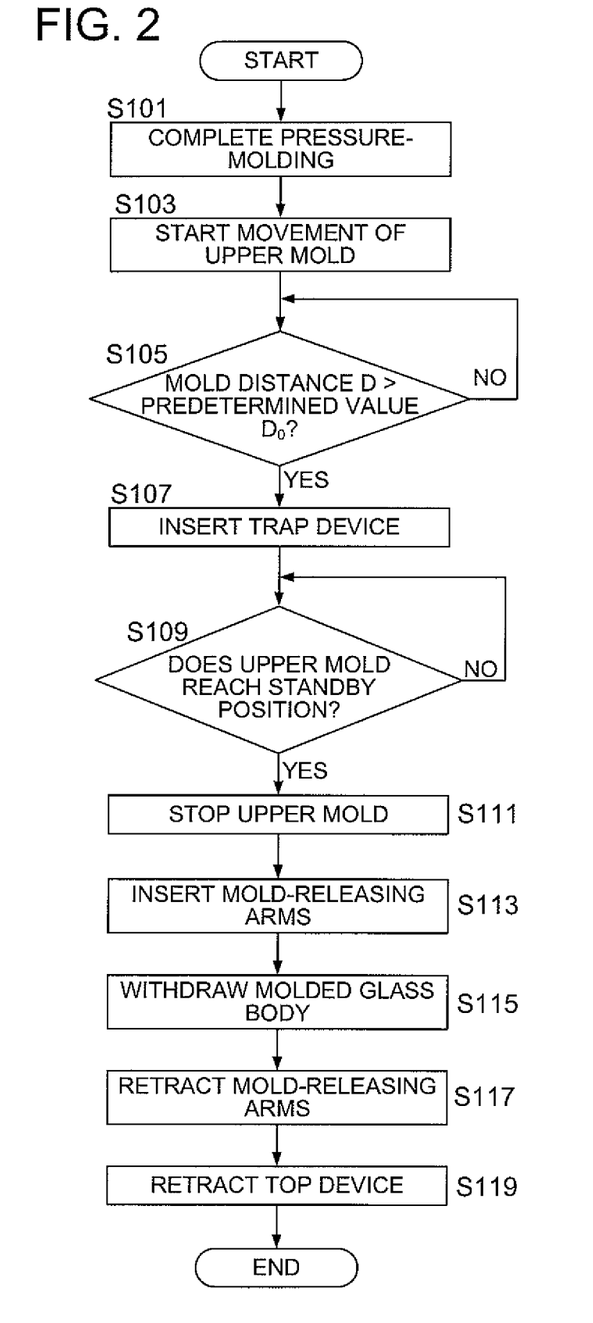
FIG. 2 shows a flowchart illustrating operations of the first embodiment.

Next, the operations of the first embodiment of the present invention will be described in detail, with referring to FIGS. 2 and 3a to 3e. FIG. 2 shows a flowchart illustrating operations during a period that molded glass body 41 is withdrawn after the pressure-molding is completed until the method moves to the next pressure-molding operation, in the first embodiment of the present invention. FIGS. 3a to 3e show schematic views illustrating conditions of respective steps in FIG. 2.

Figure 3A:
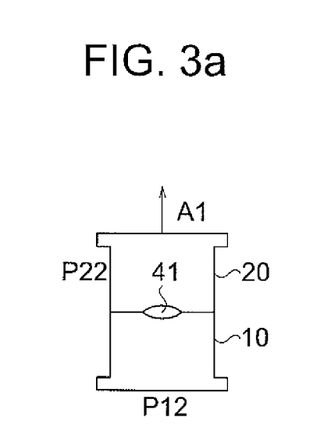
FIGS. 3a to 3e show schematic views illustrating conditions of respective steps in FIG. 2.
Figure 3B:
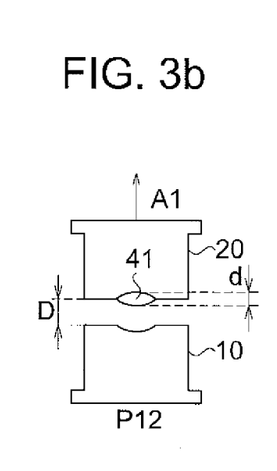

In FIG. 2, when pressure molding has been completed in step S101 (corresponding to the condition in FIG. 3a), upper mold 20 starts moving from pressing position P22 in first direction A1 that is a direction increasing distance D between the upper mold 20 and the lower mold 10 shown in FIG. 3a, namely a separating direction in step S103, that is, the upper mold starts moving upward in the figure. In step S105, it is checked whether distance D between upper mold 20 and lower mold 10 becomes larger than predetermined value D0 or not.

As the way to check distance D, known methods such as a measurement using a position sensor, and a mathematic operation based on counting of the number of steps of a step motor, can be employed and it is not especially limited. Predetermined value D0 is a value determined such that, even if trap device 60 is inserted in step S107 which will be described below, trap device 60 does not strike molded glass body 41. For example, the value is greater than the sum of thickness d of molded glass body 41 shown in FIG. 3b and thickness d2 of trap device 60 shown in FIG. 3c.

Figure 3C:
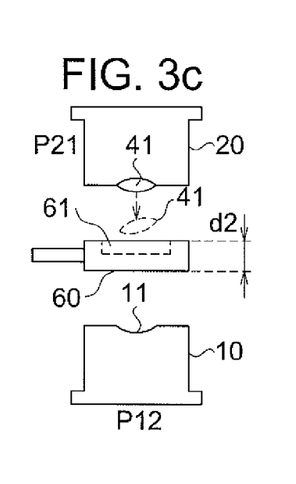

The operations are on standby at step S105 until distance D between upper mold 20 and lower mold 10 becomes greater than predetermined value D0, and move to step S107 when it becomes greater than the value (step S105; Yes). In step S107, trap device 60 is inserted to a position between upper mold 20 and lower mold 10 as shown in FIG. 3c.

Trap device 60 is a device for receiving molded glass body 41 which is falling down from upper mold 20 at a position between upper mold 20 and lower mold 10, and a device, for example, having a shape of saucer with thickness d2 and including concave portion 61 in its center. Trap device 60 is usually on standby at a retracting position which is not illustrated, and is inserted to a position to receive molded glass body 41 which is falling down, with timing of the above-described step S107, in other words, while upper mold 20 moves to standby position P21. Molded glass body 41 which has received by trap device 60 is withdrawn by, for example, reversing trap device 60 at the retracting position.

Molded glass body which has been withdrawn from trap device 60 can be reused as material to be put into melting tank 30, or can be used as a product if it is not damaged. In order to prevent molded glass body 41 received by trap device 60 from being damaged, it is preferable that the top surface of trap device 60 is formed of material to absorb an impact.

In step 109, it is checked whether upper mold 20 reaches standby position P21 or not. As the way to check that, known methods such as a measurement using a position sensor, a mathematic operation based on calculation of the number of steps of a step motor, and working of a position switch, can be employed and it is not especially limited.

The method is on standby at step S109 before upper mold 20 reaches standby position P21. When upper mold 20 reaches standby position P21 (step S109; Yes), the movement of upper mold 20 is stopped in step S111.

Figure 3D:
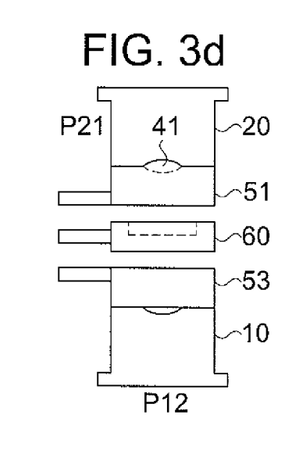
Figure 3E:
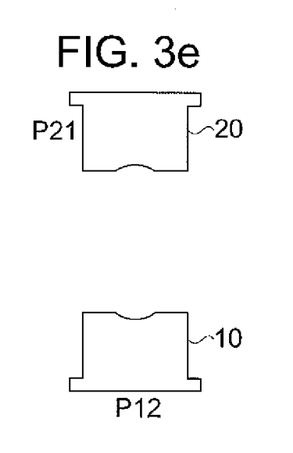

Similarly to FIG. 7d, mold-releasing arms 51 and 53 are inserted to positions facing molding surface 21 of upper mold 20 and molding surface 11 of lower mold 11, respectively, in step S113, and molded glass body 41 is withdrawn in step S115 (corresponding to the condition shown in FIG. 3d). Mold-releasing arms 51 and 53 are retracted to an unillustrated retracting position in step S117, and trap device 60 is retracted to an unillustrated retracting position in step S119, then, a series of operations is finished (corresponding to the condition shown in FIG. 3e). If the method moves to the next manufacturing operations of a molded glass body immediately, the movement of lower mold 10 from pressing position P12 toward chipping position P11 starts.

Herein, operations from step S103 to S119 work as a mold-releasing step in the present invention, and operations of step S107 and step S119 work as a fall-preventing step. Mold-releasing arms 51 and 53 correspond to a mold-releasing means of the present invention.

As described above, according to the first embodiment of the present invention, there can be provided a device for manufacturing molded glass body, wherein a trap device for receiving a molded glass body which is falling down from the upper mold is inserted into a position between the upper mold and the lower mold. Thereby, even if a molded glass body which has been stuck on the upper mold falls down during a period from an end of the pressure molding to releasing and withdrawing the molded glass body obtained by the pressure molding from the any one of the upper mold and the lower mold, the molded glass body does not damage the lower mold.

Figure 4:
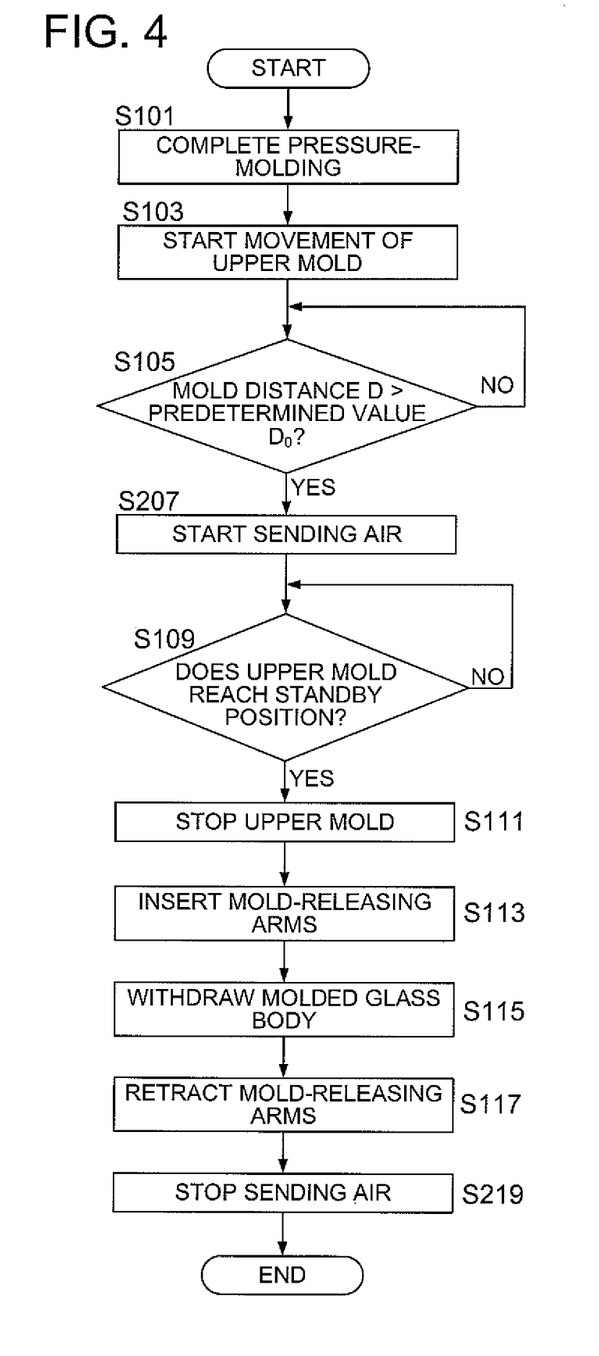
FIG. 4 shows a flowchart illustrating operations of the second embodiment.

Next, operations of in the second embodiment of the present invention will be described with referring to FIGS. 4 and 5a to 5e. FIG. 4 shows a flowchart illustrating operations of the second embodiment of the present invention during a period that molded glass body 41 is withdrawn after the pressure-molding is completed until the method moves to the next pressure-molding operation. FIGS. 5a to 5e show schematic views illustrating conditions of respective steps in FIG. 4.

Figure 5A:
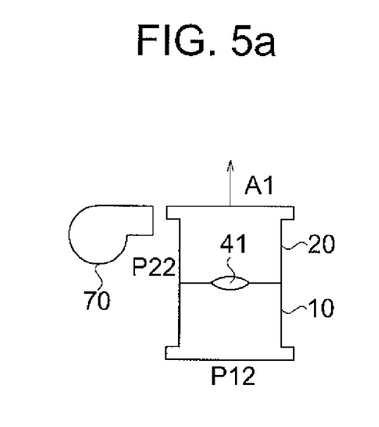
FIGS. 5a to 5e show schematic views illustrating conditions of respective steps in FIG. 4.
Figure 5B:
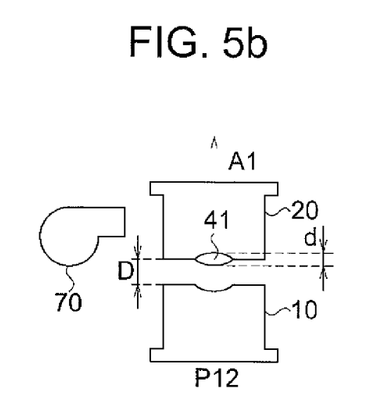

In the second embodiment, in place of trap device 50 in the first embodiment, there is arranged air-blow device 70 for blowing gas 71 against a space between upper mold 20 and lower mold 10, under the condition that the movement of upper mold 20 in direction A1 starts after the pressure molding has been completed, as shown in FIG. 5a.

In FIG. 4, steps S101 and S103 are same to those of the first embodiment in FIG. 2, and their descriptions are omitted. In step 105, it is checked whether distance D between upper mold 20 and lower mold 10 becomes greater than predetermined value D0 or not.

As the way to check distance D, known methods such as a measurement using a position sensor, and a mathematic operation based on counting of the number of steps of a step motor, can be employed and it is not especially limited. Pre-determined value D0 is a value determined such that, even if air-blow device 70 blows gas 71 in step S207 which will be described below, molded glass body 41 which has been stuck on upper mold 20 or lower mold 10 is not blown off. For example, the value is greater than the sum of thickness d of molded glass body 41 shown in FIG. 5b and blowing area d3 of air-blow device 70.

The operations are on standby at step S105 until distance D between upper mold 20 and lower mold 10 becomes greater than predetermined value D0, and move to step S207 when it becomes greater than the value (step S105; Yes). In step S207, air-blow device 70 starts blowing gas 71 against a space between upper mold 20 and lower mold 10 as shown in FIG. 5c.

Figure 5C:
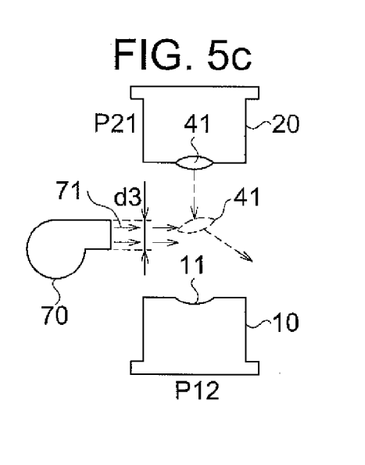
Figure 5D:
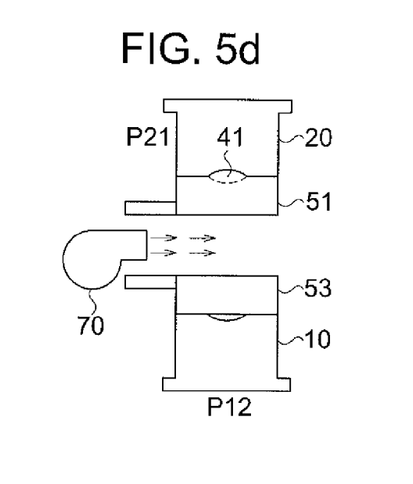

By blowing gas 71, even if molded glass body 41 falls down from the upper mold as illustrated by broken lines in FIG. 5c, molded glass body which is falling down is blown off by gas 71 and does not fall down on molding surface 11 of lower mold 10.

It is preferable that gas 70 to be blown is an inert gas such as nitrogen gas, or air. It is preferable that it has the similar temperature to the ambient temperature of the inside of pressure molding machine 2, because molded glass body 41 causes abnormal wave-surface and bad appearance such as a crack when gas 71 changes the temperature of upper mold 20 and lower mold 10.

Operation from step S109 to step S117 are same to those of the first embodiment shown in FIG. 2, and their descriptions are omitted.

Figure 5E:
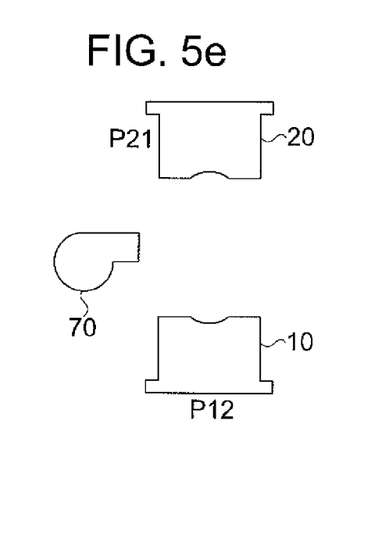

When air-blow device 71 stops blowing, a series or operations is finished (corresponding to the condition shown in FIG. 5e). If the method moves to the next manufacturing operations of a molded glass body immediately, the movement of lower mold 10 from pressing position P12 toward dripping position P11 starts.

Herein, operations from step S103 to S219 work as a mold-releasing step, and operations of step S207 and step S219 work as a fall-preventing step.

As described above, according to the second embodiment of the present invention, there can be provided a device for manufacturing molded glass body, including an air-blow device for blowing gas against a space between the upper mold and the lower mold, to blow off the molded glass body which is falling down from the upper mold. Thereby, even if a molded glass body which has been stuck on the upper mold falls down during a period from an end of the pressure molding to releasing and withdrawing the molded glass body obtained by the pressure molding from the any one of the upper mold and the lower mold, the molded glass body does not damage the lower mold.

In the first and second embodiments, the manufacturing devices used for a liquid-drop molding method have been described. However, the scope of the invention is not limited to that and it can be applied to a reheat pressing method. In that case, melting tank 30 and dripping nozzle 31 should be replaced to a glass-preform-supplying section for supplying a glass preform corresponding to a glass precursor in the present invention, on the lower mold.

As described above, according to the present invention, there can be provided a device for manufacturing a molded glass body, including a fall-prevention means for preventing the glass molded body which has stuck on the upper mold from falling down on the lower mold. Thereby, even if the molded glass body which has stuck on the upper mold falls down during a period from an end of the pressure molding to releasing and withdrawing the molded glass body obtained by the pressure molding from the any one of the upper mold and the lower mold, the molded glass body does not damage the lower mold.

Detailed structures of components constructing the device for manufacturing a molded glass body relating to the present invention, and their detailed operations may be modified unless otherwise such modifications depart from the scope of the present invention.

REFERENCE SIGNS LIST

1 Device for manufacturing molded glass bodies
10 Lower mold
11 Molding surface (of lower mold 10)
20 Upper mold
21 Molding surface (of upper mold 20)
30 Melting tank
31 Dripping nozzle
40 Drop of molten glass
41 Molded glass body
51 Mold-releasing arm
53 Mold-releasing arm
60 Trap device
61 Concave portion (of trap device 60)
70 Air-blow device
71 Gas (from air-blow device 70)
A1 Direction increasing distance D
D Distance (between upper mold 20 and lower mold 10)
D0 Predetermined value
d Thickness (of molded glass body 41)
d2 Thickness (of trap device 60)
d3 Blowing area (of air-blow device 70)
P11 Dripping position
P12 Pressing position
P21 Standby position
P22 Pressing position

The invention claimed is:

1. A device for manufacturing a molded glass body comprising:
    an upper mold and a lower mold configured to pressure-mold a glass precursor to obtain a molded glass body, one of the upper mold and the lower mold, referred to as a moving mold, configured to move to a pressing position to pressure-mold the glass precursor and move to a standby position after the pressure-molding is completed wherein the molded glass body is stuck on one of the upper mold and the lower mold, referred to as a stuck mold, when the moving mold moves toward the standby position and wherein the molded glass body stuck on the stuck mold referred to as a stuck glass body;
    a mold-releasing member configured to be inserted in a releasing position between the upper mold and the lower mold after the moving mold reaches the standby position, the mold-releasing member configured to release the stuck glass body at the releasing position and withdraw the stuck glass body; and
    a fall-prevention member configured to be inserted into a receiving position between the upper mold and lower mold to cover the lower mold, after the moving mold starts moving toward the standby position and before the mold-releasing member releases the stuck glass body so as to prevent the stuck glass body falling from the upper mold from hitting the lower mold, the fall prevention member configured to receive the stuck glass body when the stuck mold is the upper mold and the stuck glass body falls off by its weight.

2. A device for manufacturing a molded glass body of claim 1, wherein the fall-prevention member has a concave portion to receive the stuck glass body therein.

3. A device for manufacturing a molded glass body of claim 1, wherein the mold-releasing member sucks the stuck glass body to release the stuck glass body.

4. A device for manufacturing a molded glass body of claim 1, wherein
    the lower mold is configured to receive a drop of molten glass at a dripping position to form the glass precursor when the upper mold is at the standby position, and move to the pressing position, which is different from the dripping position, to pressure-mold the glass precursor with the upper mold.

5. A device for manufacturing a molded glass body of claim 1, further comprising a glass-preform supplying member configured to supply a glass preform having a predetermined mass and a predetermined shape on the lower mold.

6. A device for manufacturing a molded glass body of claim 1, further comprising a glass-preform supplying member configured to supply a glass preform having a predetermined mass and a predetermined shape on the lower mold.

7. A device for manufacturing a molded glass body comprising:
    an upper mold and a lower mold configured to pressure-mold a glass precursor to obtain a molded glass body;
    a mold-releasing member configured to release and withdraw the molded glass body which has stuck on one of the upper mold and the lower mold; and
    a fall-prevention member configured to prevent the molded glass body, which was stuck on the upper mold and has fallen off the upper mold, from falling down on the lower mold without being released and withdrawn by the mold-releasing member,
    wherein the fall-prevention member is an air-blow device for blowing gas against a space between the upper mold and the lower mold to blow off the molded glass body which has fallen off the upper mold and is falling down toward the lower mold.

8. A device for manufacturing a molded glass body of claim 7, wherein one of the upper mold and the lower mold, referred to as a moving mold, is configured to move to a pressing position to pressure-mold the glass precursor and then move to a standby position after the pressure-molding is completed, wherein the molded glass body is stuck on one of the upper mold and the lower mold, referred to as a stuck mold, when the moving mold moves toward the standby position and wherein the molded glass body stuck on the stuck mold is referred to as a stuck glass body and
    the mold-releasing member is configured to be inserted in a releasing position between the upper mold and the lower mold after the moving mold reaches the standby position, the mold-releasing member configured to release at the releasing position the stuck glass body on the stuck mold and withdraw the stuck glass body.

9. A device for manufacturing a molded glass body of claim 7, wherein the mold-releasing member sucks the stuck glass body to release the stuck glass body.

10. A device for manufacturing a molded glass body of claim 7, wherein
    the lower mold is configured to receive a drop of molten glass at a dripping position to form the glass precursor when the upper mold is at the standby position, and move to the pressing position, which is different from the dripping position, to pressure-mold the glass precursor with the upper mold.

* * * * *